United States Patent [19]

Toshiyuki

[11] Patent Number: 5,181,457
[45] Date of Patent: Jan. 26, 1993

[54] SEED PEELING APPARATUS

[76] Inventor: Iizuka Toshiyuki, 242, Yamate, Naka-ku, Yokohama-shi, Kanagawa-ken, Japan

[21] Appl. No.: 757,938

[22] Filed: Sep. 12, 1991

[30] Foreign Application Priority Data

Sep. 25, 1990 [JP] Japan .................... 2-254856

[51] Int. Cl.$^5$ ............................................. A23N 5/00
[52] U.S. Cl. ................... 99/514; 47/DIG. 9; 209/29; 209/154
[58] Field of Search .................... 47/57.6, DIG. 9; 366/138, 139, 191, 194, 195, 196, 244–245, 247, 248, 251, 279; 99/600, 601, 602, 609, 610, 611, 621, 623, 514; 209/28, 29, 154, 282, 283; 241/6–9, 11, 14, 22, 24, 26, 29, 79.2, 79.3, 481; 406/171, 172, 174; 426/481–483

[56] References Cited

U.S. PATENT DOCUMENTS

| | | | |
|---|---|---|---|
| 115,294 | 5/1871 | Forbes | 241/22 |
| 744,390 | 11/1903 | Osborne et al. | 209/28 |
| 1,406,761 | 2/1922 | Rusnak | 241/79.2 |
| 1,424,638 | 8/1922 | Giozza | 99/609 |
| 1,445,189 | 2/1923 | Whiteside | 99/514 |
| 1,651,300 | 11/1927 | Stark | 99/514 |
| 2,099,505 | 11/1937 | Weaver | 209/154 X |
| 2,384,181 | 9/1945 | La Fave | 209/28 |
| 2,387,488 | 10/1945 | Acken et al. | 366/139 |
| 2,731,052 | 1/1956 | Grimard | 99/615 |
| 2,771,111 | 11/1956 | Seyfried | 146/68 |
| 2,930,596 | 3/1960 | Waters | 366/279 |
| 2,959,893 | 11/1960 | Harmos et al. | 99/514 |
| 3,165,134 | 1/1965 | Wayne | 99/610 X |
| 3,251,558 | 5/1966 | Palyi | 241/74 |
| 3,519,052 | 7/1970 | Girgis | 99/610 |
| 3,974,968 | 8/1976 | Ceballos-Aquilera | 244/11 |
| 4,459,903 | 7/1984 | Yamamoto | 99/611 |
| 4,724,632 | 2/1988 | Bilsland et al. | 47/DIG. 9 |
| 5,005,612 | 4/1991 | Kurtz | 366/191 |

FOREIGN PATENT DOCUMENTS

| | | | |
|---|---|---|---|
| 493467 | 5/1950 | Belgium | 99/623 |
| 832662 | 2/1952 | Fed. Rep. of Germany | |
| 1226406 | 10/1966 | Fed. Rep. of Germany | 241/6 |
| 306612 | 4/1955 | Switzerland | 209/28 |
| 387752 | 6/1973 | U.S.S.R. | 209/28 |

OTHER PUBLICATIONS

Anon. (from) "Drills and Drilling Operations", *Shop Theory*, 1942, McGraw-Hill Book Co., Inc., N.Y., pp. 80 and 81.

Primary Examiner—James R. Feyrer
Attorney, Agent, or Firm—Wenderoth, Lind & Ponack

[57] ABSTRACT

By rotating a seed agitater means such as a rotary cutter within a seed container in which seeds such as of spinach and lawn grass are admitted, the seeds are peeled to separate seed cores from seed coats while being stirred. The seed cores free from the seed coats are allowed to pass through a screen attached to the bottom of the seed container so as to collect stripped seeds thus obtained. The stripped seeds enjoy a very high rate of germination.

12 Claims, 9 Drawing Sheets

SEED PEELING APPARATUS

BACKGROUND OF THE INVENTION

1. Field of the Invention

This invention relates to a seed peeling apparatus for automatically removing seed coats from seeds such as of spinach and lawn grass or cracking the seed coats to increase the germinating rate of the seeds.

2. Description of the Prior Art

In general, a seed of an angiosperm such as spinach is composed of a relatively hard seed coat (exocarp) of about 2 to 4 mm in outer diameter and a seed core (stripped seed; endocarp) of about 1 to 3 mm in diameter which is enclosed in the seed coat. Though the seed coat functions to protect the seed core, it tends to hinder the germination of the seeds. Accordingly when the seeds are sown as they are, coated with the seed coats, the germinating rate of the seeds becomes remarkably low.

For instance, the Korean lawn grass native to China and the Korean Peninsula is broadly planted in a golf course because it is tolerant of blight and noxious insects. However, the seeds of lawn grass, when being coated with the seed coats, is low in germinating rate, i.e. about 15% at the most. Then, as one possible way for increasing the germinating rate of the seeds of the lawn grass, attempts are now being made to remove the seed coats from the seeds by hand before being planted. In this case, the germinating rate of the stripped seeds without seed coats could be improved, whereas the work of peeling off the seed coats from the seeds would be onerous and irrational.

In order to effectively peel the seeds, there has been used a pressure roller-type seed peeling apparatus in which the seeds are passed through between rotating rollers coming into pressure contact with each other so as to crush the seed coats. This apparatus however has entailed a disadvantage in that the seed cores enclosed in the seed coats were often damaged. In a case of peeling &he seeds with fibrous or sticky seed coats, the seeds must be cooled to make the seed coats brittle. Nevertheless, the problem in that the seed cores are damaged as stated above still remains. Therefore, with the conventional pressure roller-type seed peeling apparatus, the germinating rate of the seeds could not be increased over 30%. Moreover, the apparatus of this type is quite bulky and expensive.

However, the stripped seed which is obtained by completely removing the seed coat therefrom entails a problem such as deterioration to considerably shorten the life of the seeds. Therefore, the seeds have been desired to be preserved without deterioration for a long time.

OBJECT OF THE INVENTION

This invention is made to eliminate the drawbacks suffered by the conventional seed peeling apparatus as described above and has an object for providing a simple and convenient seed peeling apparatus for automatically removing seed coats from seeds with a high efficiency without inflicting too much injury to the seed cores so as to increase the germinating rate of the seeds.

Another object of this invention is to provide a seed peeling apparatus capable of effectively cracking the seed coats by rotating cutting blades and automatically separating the seed cores from the seed coats by use of difference in mass between the seed core and seed coat.

Still another object of this invention is to provide a seed peeling apparatus capable of obtaining seeds which can be preserved without deterioration for a long time.

SUMMARY OF THE INVENTION

To attain the objects described above according to this invention there is provided a seed peeling apparatus comprising a container for seeds, seed agitating means rotatable within the seed container, and screen means attached to the bottom of the seed container.

The seed agitating means may be comprised of rotary cutter means with cutting blades. The cutting blades of the rotary cutter means are rotated to repeatedly give blows to the seeds in the seed container while stirring the seeds in all directions, consequently causing the seed coats of the seeds to be broken or cracked.

A relief preventing means within the seed container is disposed for preventing the seeds in the container from rising when being stirred by the cutting blades. The efficiencies of peeling and stirring the seeds can thus be heightened.

Beneath the screen means attached to the bottom of the seed container, there may be provided a collecting receptacle for receiving the seed cores separated from the seed coats.

Upon putting the seeds into the seed container, the cutting blades of the cutter means are rotated to give blows to the seeds over and over while stirring the seeds in the container. As a result, the seed coats are broken and separated from the seed cores in time. When stirring the seeds, abrasive materials may be added into the container so as to effectively remove the seed coats broken or cracked from the seed cores.

Since the seed core is larger in mass than the seed coat, the seed cores free from the seed coats would subside and the waste seed coats separated from the seed cores come up in the seed container. The seed cores moving down to the bottom of the container would pass downward through the screen means into the collecting receptacle. The waste seed coats may be drawn out of the container through a suction pipe connected to a suction means such as a vacuum pump. Otherwise, a rotary abrasive member for shaving the seeds may be used as the aforenoted seed agitating means, so as to make the seed coats sufficiently thin. The seeds with thin seed coats would germinate readily, thereby remarkably increasing the germinating rate of the seeds. Also in this case, abrasive materials may be added into the container to effectively shave the seeds.

The features of the present invention which are believed to be novel are set forth with particularity in the appended claims. The present invention, both as to its organization and manner or operation, together with further objects and advantages thereof, may best be understood by reference to the following description, taken in conjunction with the accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
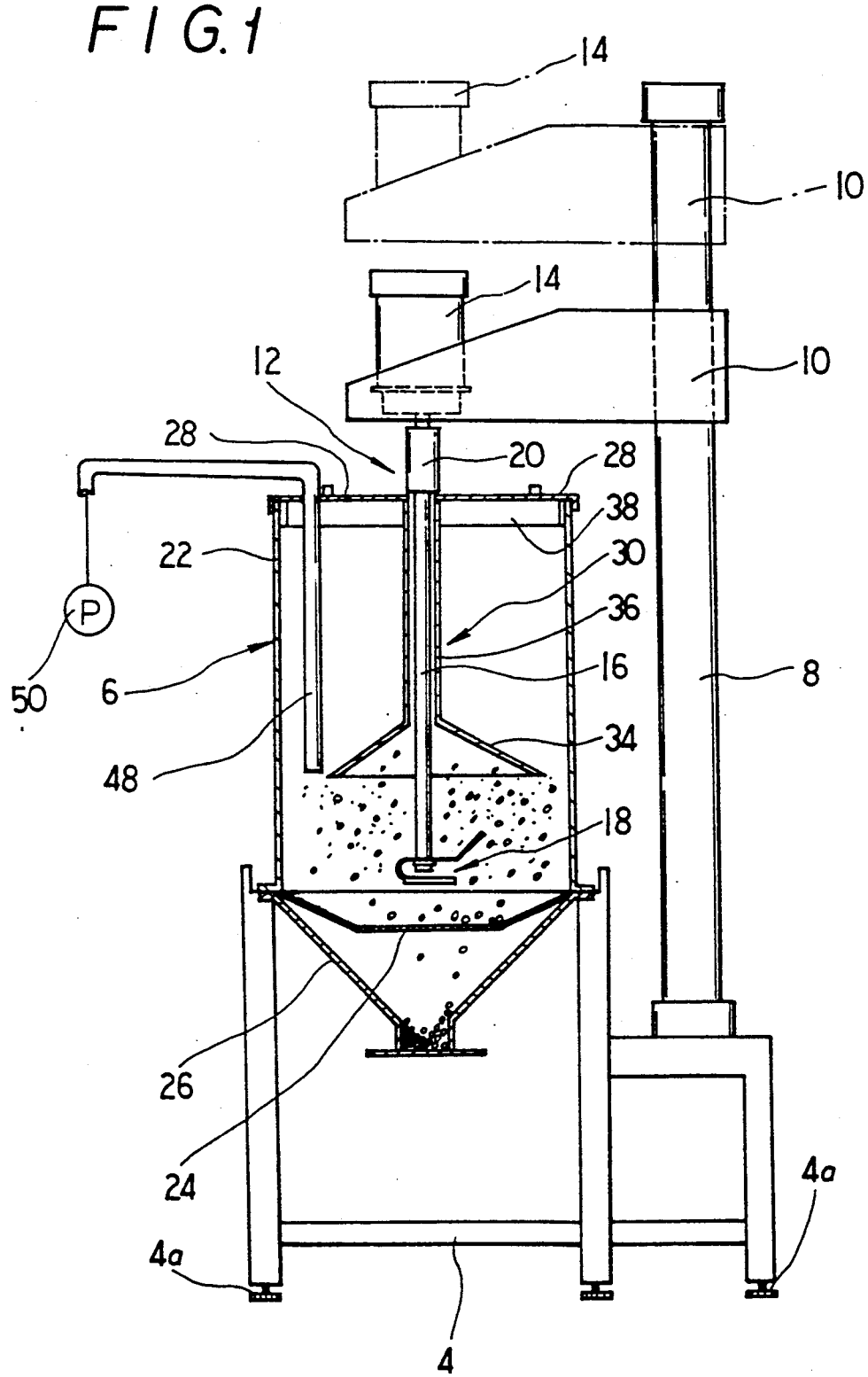
FIG. 1 is a sectional side elevation schematically showing a first embodiment of a seed peeling apparatus according to this invention.
Figure 2:
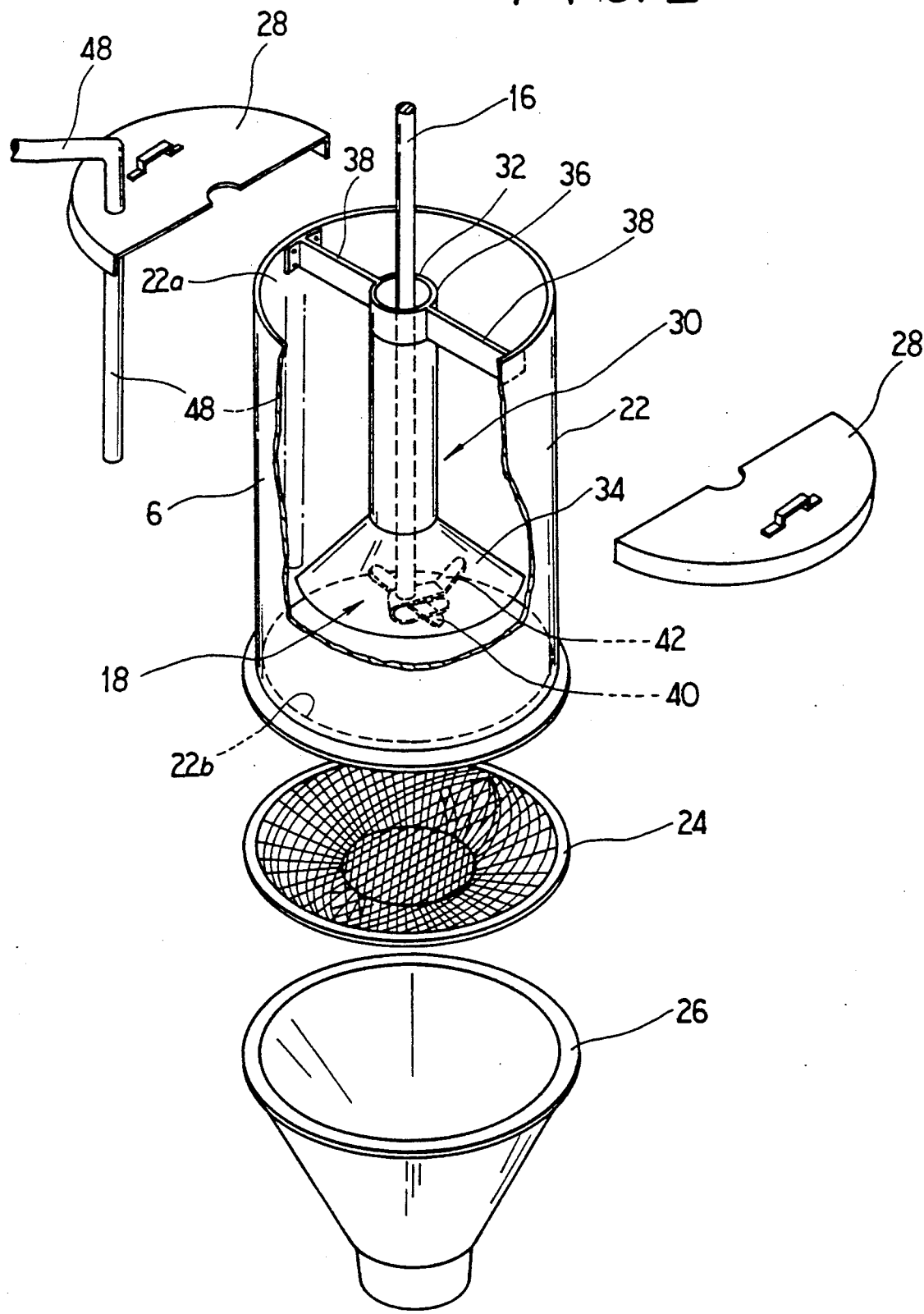
FIG. 2 is an exploded perspective view of the seed peeling apparatus of FIG. 1.

The seed peeling apparatus shown in FIGS. 1 and 2 as a first embodiment of the present invention comprises a base member 4 having leveling means 4a, a supporting upright column 8 fixed on the base member 4, a bracket 10 disposed movably vertically along the upright column 8, a substantially cylindrical seed container 6 for seeds S which is supported by the base member 4, and a seed agitating means 12 which is held by the bracket 10.

In this embodiment, the seed agitating means is a rotary cutter means for giving blows to and peeling the seeds in the seed container 6.

The rotary cutter means 12 comprises a rotary driving means 14 such as a motor which is retained by the bracket 10, a rotating shaft 16 connected to the rotary driving means 14 through a joint 20, and a rotating blade 18 attached to the lower end portion of the rotating shaft 16.

The seed container 6 comprises a container body 22 having a seed inlet opening 22a and a bottom opening 22b, screen 24 covering the bottom opening 22b, a and a collecting receptacle 26 attached to the lower side of the screen 24. The seed inlet opening 22a of the seed container 22 may be covered with a lid member 28.

Inside the seed container 22, there is disposed a relief preventing means 30 for preventing the rising of the seeds S which is caused by stirring the seeds in the seed container 6 by the rotating blade means 18. Though the relief preventing means 30 comprises a retainer 36 extending downward from a stiffening rib 38 and a substantially cone-shaped keep plate 34 retained on the lower end of &he retainer 36 as illustrated in the drawings, the structure of the relief preventing means 30 should not be understood as limited to the illustrated embodiment. An alternate structure for retaining the keep plate may be employed in which the keep plate 34 is supported by horizontal rods (not shown) extending radially inward from the inner surface of the container body 22.

The screen means 24 may be composed of a net or net-like plate with a mesh larger than the average diameter of a stripped seed (seed core N) and smaller than the average diameter of a seed S with seed coat.

Figure 3:
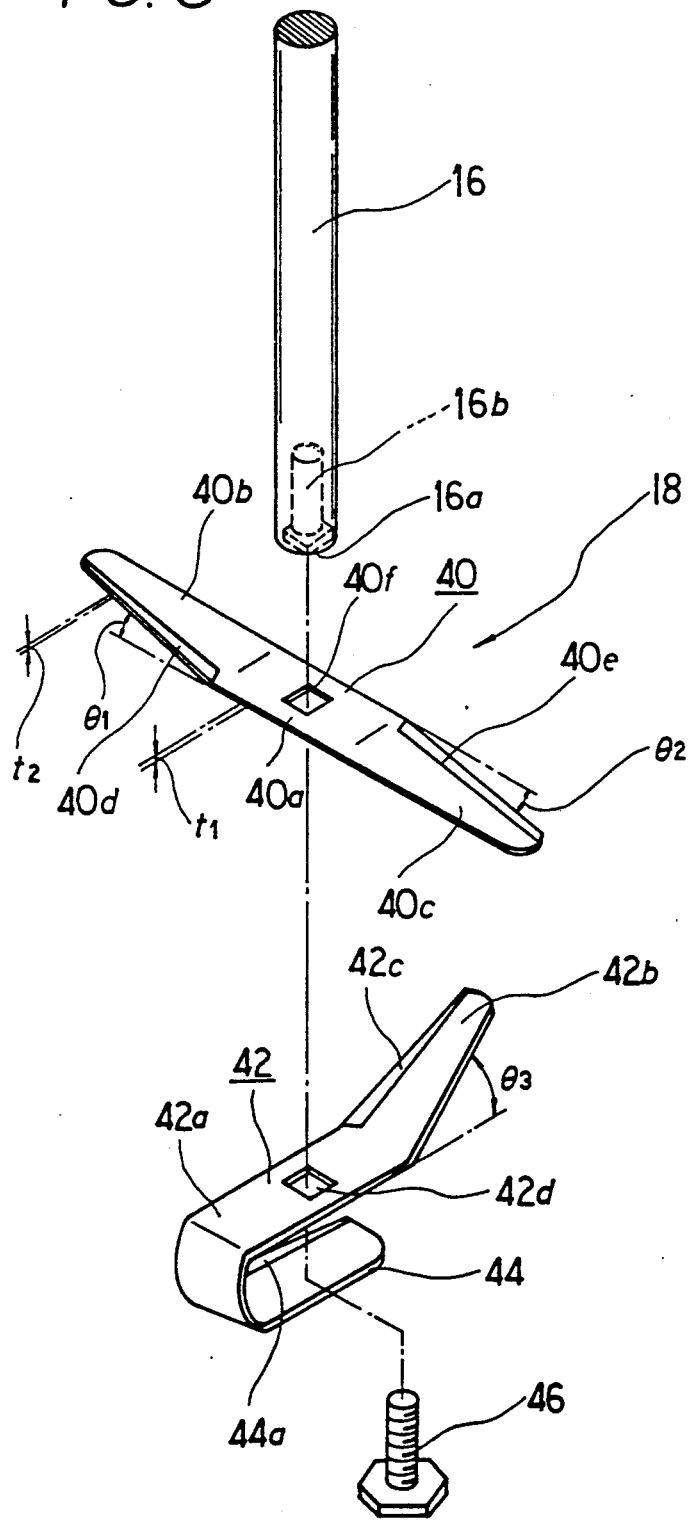
FIG. 3 is an exploded perspective view of a rotary cutter means in the seed peeling apparatus of FIG. 1.
Figure 4:
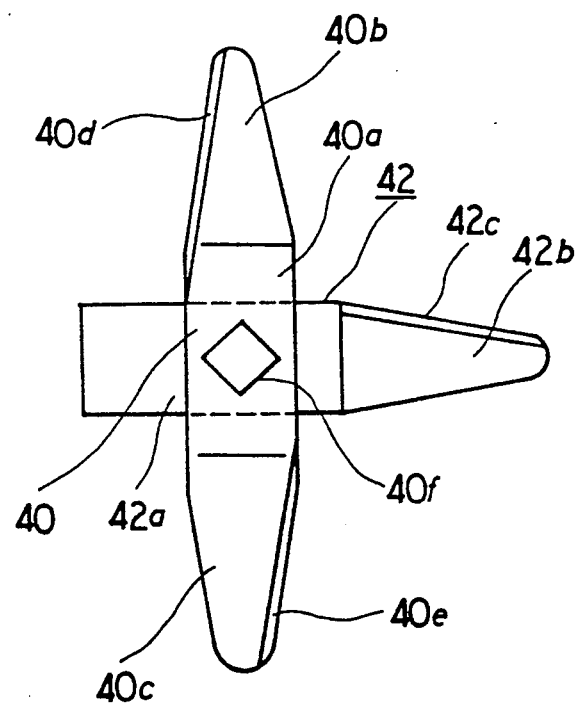
FIG. 4 is a plan view of the rotary cutter means of FIG. 3.

As illustrated in FIGS. 3 and 4, the blade means 18 of the rotary cutter means 12 used as the seed agitating means in this embodiment comprises an upper blade 40, a lower blade 42 intersecting with the upper blade 40, and an auxiliary blade 44 extending curvedly downward from the blade 42. As a matter of course, the upper and lower blades 40 and 42 may be integrally formed in one body by, for example, stamping out a steel plate.

The upper blade 40 has a fixing flat portion 40a, an upward inclined portion 40b, and a downward inclined portion 40c. The upward and downward inclined portions 40b and 40c each have a cutting edge (40d or 40e). The cutting edges 40d and 40e are not very sharp and somewhat large in curvature so as not to cut the seed entirely. There has been actually manufactured an upper blade 40 of 2 mm in thickness (t1) at the fixing flat portion 40a and 0.08 mm in thickness (t2) at the free ends of the upward and downward inclined portions 40b and 40c. In this blade, the angles $\theta 1$ and $\theta 2$ of the upward and downward inclined portions 40b and 40c relative to the fixing flat portion 40a are about 15°, respectively.

The lower blade 42 has a fixing flat portion 42a and an obliquely rising portion 42b. Similarly to the cutting edges 40e of the upper blade 40, the obliquely rising portion 42b has a cutting edge 42c which is not very sharp and somewhat large in curvature so as not to cut the seed entirely. In the actually manufactured blade 42, the angle $\theta 3$ of the obliquely rising portion 42b relative to the fixing flat portion 42a is about 45°. The auxiliary blade 44 has also a cutting edge 44a.

One example of the fixing structure of the upper and lower blades 40 and 42 to the rotating shaft 16 is shown in FIG. 3. This fixing structure is constituted by a non-circular projection 16a formed at the lower end of the rotating shaft 16, non-circular holes 40f and 42d formed in the upper and lower blades 40 and 42, and a screw 46.

In FIGS. 1 and 2, reference numeral 48 denotes a suction pipe having a suction port positioned nearly at the level of the keep plate 34. The suction pipe 48 is connected to a suction means 50 such as a vacuum pump.

Although the blades 40 and 42 and other elements have been described as one example, it is understood that these are not restrictive and may be embodied in several forms.

Now, the principle of peeling the seeds to separate the seed cores from the seed coats according to the seed peeling apparatus of this invention will be described with reference to FIG. 5.

Figure 5:
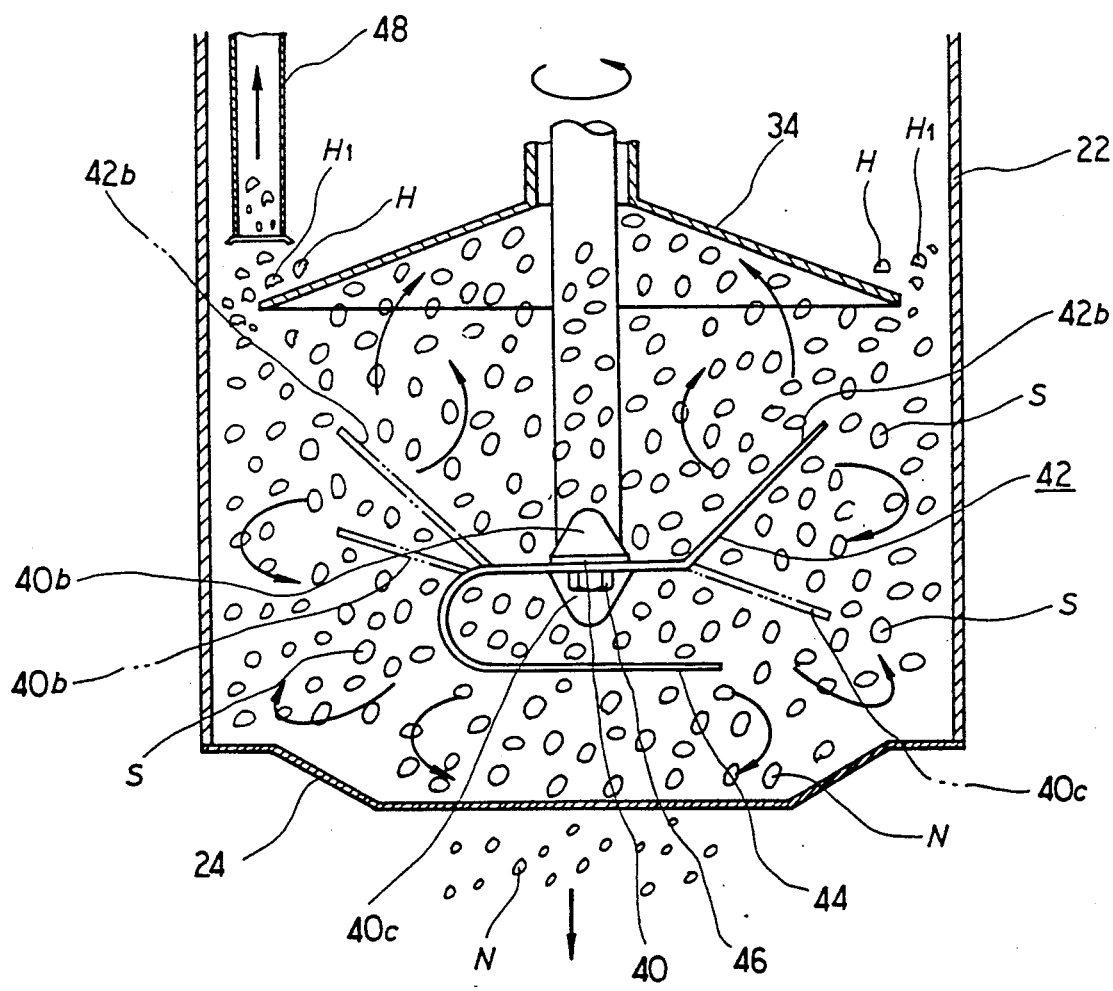
FIG. 5 is an explanatory diagram showing the state of stirring and peeling seeds in the seed peeling apparatus of this invention.

Upon putting the seeds S with the seed coats into the seed container 6, the cutter means 12 is driven to rotate the blade means 18 so as to give blows to the seeds with the rotating blades 40, 42 and 44 while stirring as indicated by the arrows in FIG. 5. The seeds S which rise with the rotation of the blades would move upward along the lower surface of the conical keep plate 34 and converge to the apex of the keep plate 34. As a result, &he seeds S would come under pressure between the blade means 18 and the conical keep plate 34 and be disabled from escaping. Therefore, the seeds under pressure would effectively suffer blows by rotating blades while being stirred up.

Figure 6A:
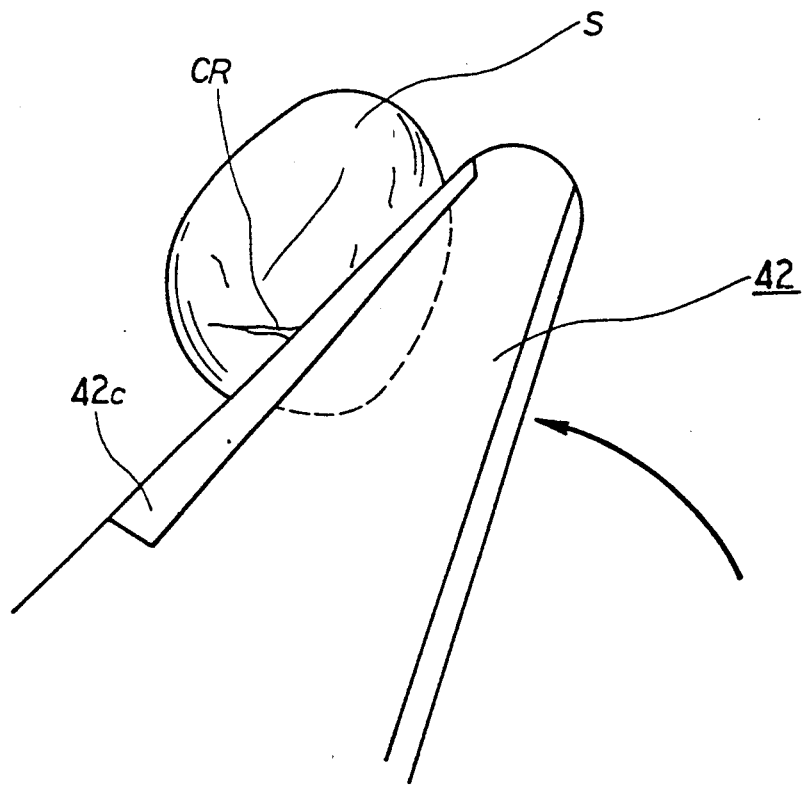
FIGS. 6(A) and 6(B) are explanatory diagrams showing a the state of peeling a seed in the seed peeling apparatus of this invention.
Figure 6B:
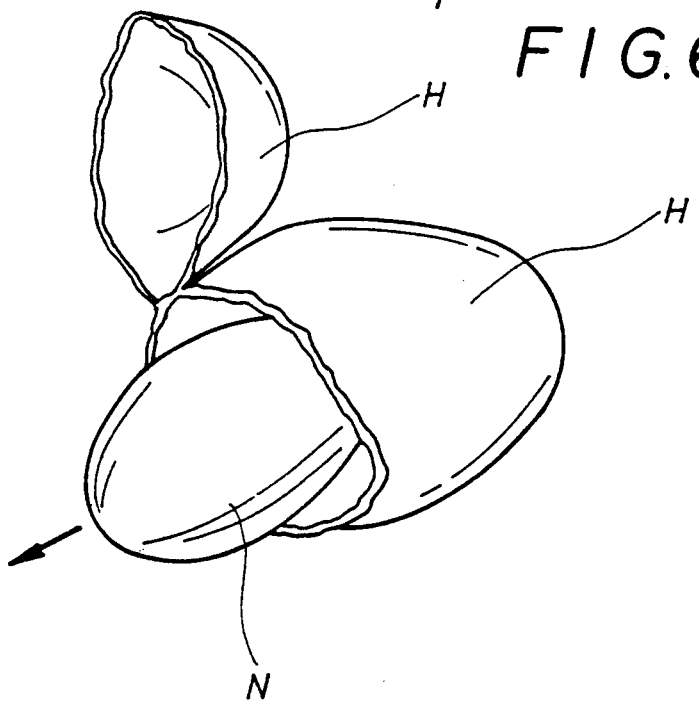

The seed coat H of the seed S in the container 6 is cracked by the rotating blades as indicated by the mark CR in FIG. 6(A) and repeatedly suffers blows. Consequently, the seed core N goes out of the seed coat H as shown in FIG. 6(B).

The seed core N larger in mass than the seed coat H would subside to the bottom of the container 6 and pass through the screen means 24 to the collecting receptacle 26. On the other hand, the seed coats H which are smaller in mass than the seed cores N come up and are drawn out through the suction pipe 48.

Where the cutter means 12 was experimentally rotated at 2400 rpm for about 30 minutes in the seeds of spinach put in the container according to this invention, the yield of seeds (ratio of the desired seed cores N to the untreated spinach's seeds S with seed coats) was about 25% on the average. In this experiment, the germinating rate of the stripped seeds was as high as about 80% on the average. The stripped seeds obtained according to this invention were subjected to a coating treatment with chemicals for temporary protection before being planted.

The result of the experiment on the effect of the damage rate of the stripped seeds (seed cores N) on germinating rate of the seeds proved that the seeds were apt to receive deadly injuries when the cutter mean continued driving at 3000 rpm over about 15 minutes. Also, it was found that in the case of rotating the cutter means 12 at a low rate of speed of about 1220 rpm, the driving time of the cutter means should preferably be determined to 40 to 45 minutes. When the cutter means was driven at a high speed to crack the seeds in a short time and then gradually decelerated, the most adequate results were obtained.

Though the yield of the stripped seeds in one peeling operation was relatively low, it could however increase when the seeds were subjected several times to the peeling treatment with the apparatus according to this invention.

Though only one unit of the seed peeling apparatus is used in the illustrated embodiment, a plurality of units may be interlinked so as to construct a seed peeling plant.

In a case of the Korean lawn grass, the germinating rate of the untreated seeds with seed coats is usually as low as about 15%, whereas the same could be remarkably increased to about 80% by utilization of the seed peeling apparatus of this invention.

The effect of peeling the seeds can be heightened by stirring the seeds together with abrasive materials in the container. In the experiment actually carried out, the yield of the stripped seeds (seed cores) relative to 500 grams of the seeds of Korean lawn grass was improved to 72% where 375 g of abrasive materials mainly containing silicon carbide was added to the seeds in the seed container 6 and the cutter means 12 was driven at 2400 rpm for 120 minutes. In place of silicon carbide, emery may be used the abrasive materials.

In the case of peeling the seeds of spinach by use of the abrasive materials, a desired ratio of the abrasive materials to the seeds is about 10 to 30 weight %. In the case of lawn grass, it is desirable to add the abrasive materials in the order of 5 to 40 weight % relative to the seeds.

Figure 7:
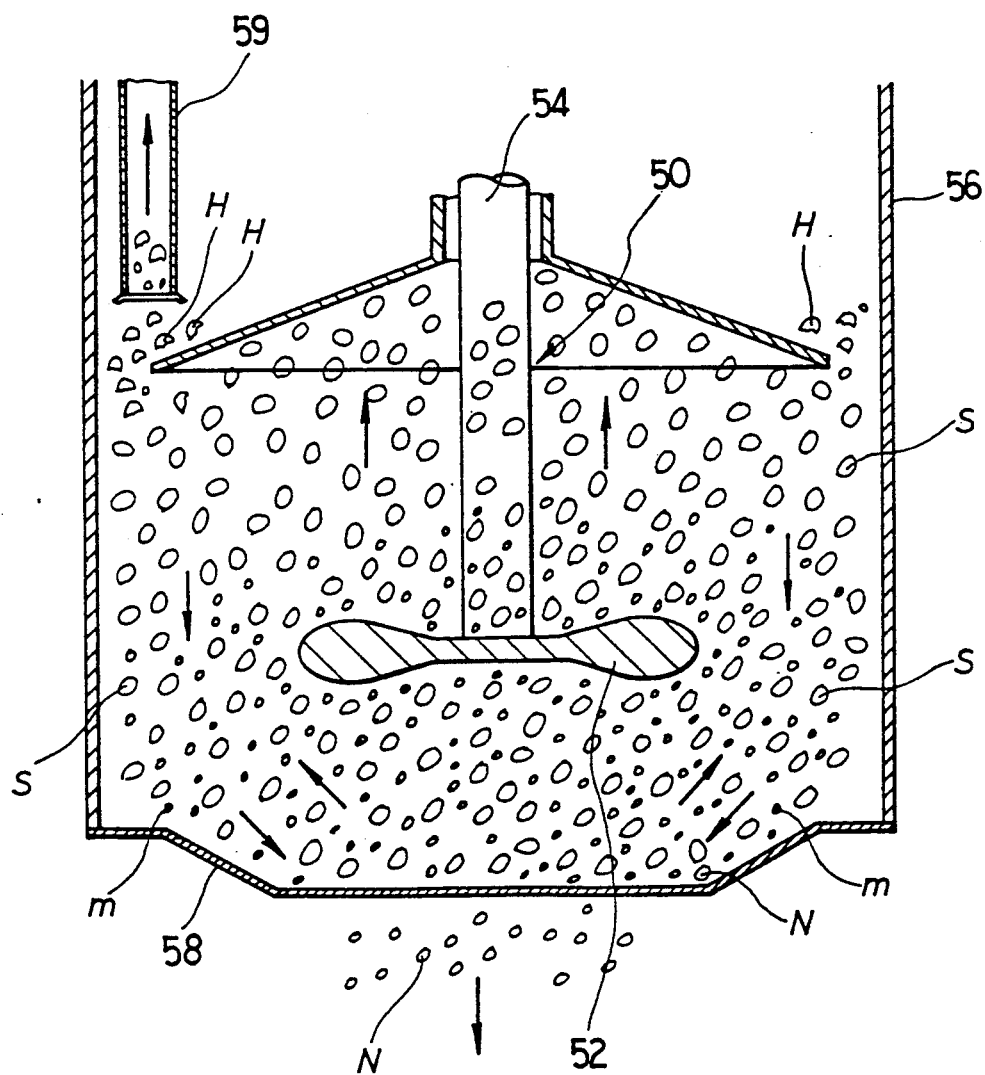
FIG. 7 is a sectional side view schematically showing the principal portion of a second embodiment of the invention.

The second embodiment of the seed peeling apparatus according to this invention is illustrated in FIG. 7, in which a seed agitating means 51 has a rotary abrasive member 52. In this embodiment, abrasive materials m are put in a container 56 along with seeds S. The rotary abrasive member 52 for stirring the seeds S with the abrasive materials has a roughened surface curved slightly. By driving a rotating shaft 54 provided at its lower end with the rotary abrasive member 52, the seeds in the container 56 are abrasively contacted with the roughened surface of the abrasive member 52 and the abrasive materials m so as to effectively make the seed coats thin uniformly. The fact that the seed peeling apparatus 1 having only the abrasive member 52 could attain sufficiently high germinating rates of the seeds was confirmed experimentally.

The seed agitating means 51 is not limited merely to the rotary abrasive member 52. For example, an agitating flow of compressed air or otherwise possible agitating methods may be used as the seed agitating means.

The seeds which are shaved by the rotary abrasive member 52, while being agitated by the aforenoted agitating means 51 are separated into the seed cores N and seed coats H. The seed cores N being larger in mass than the seed coats would sink to the bottom of the container 56 and pass through screen means 58. The seed coats H being smaller in mass than the seed cores come up and are drawn out through a suction pipe 59.

Figure 8:
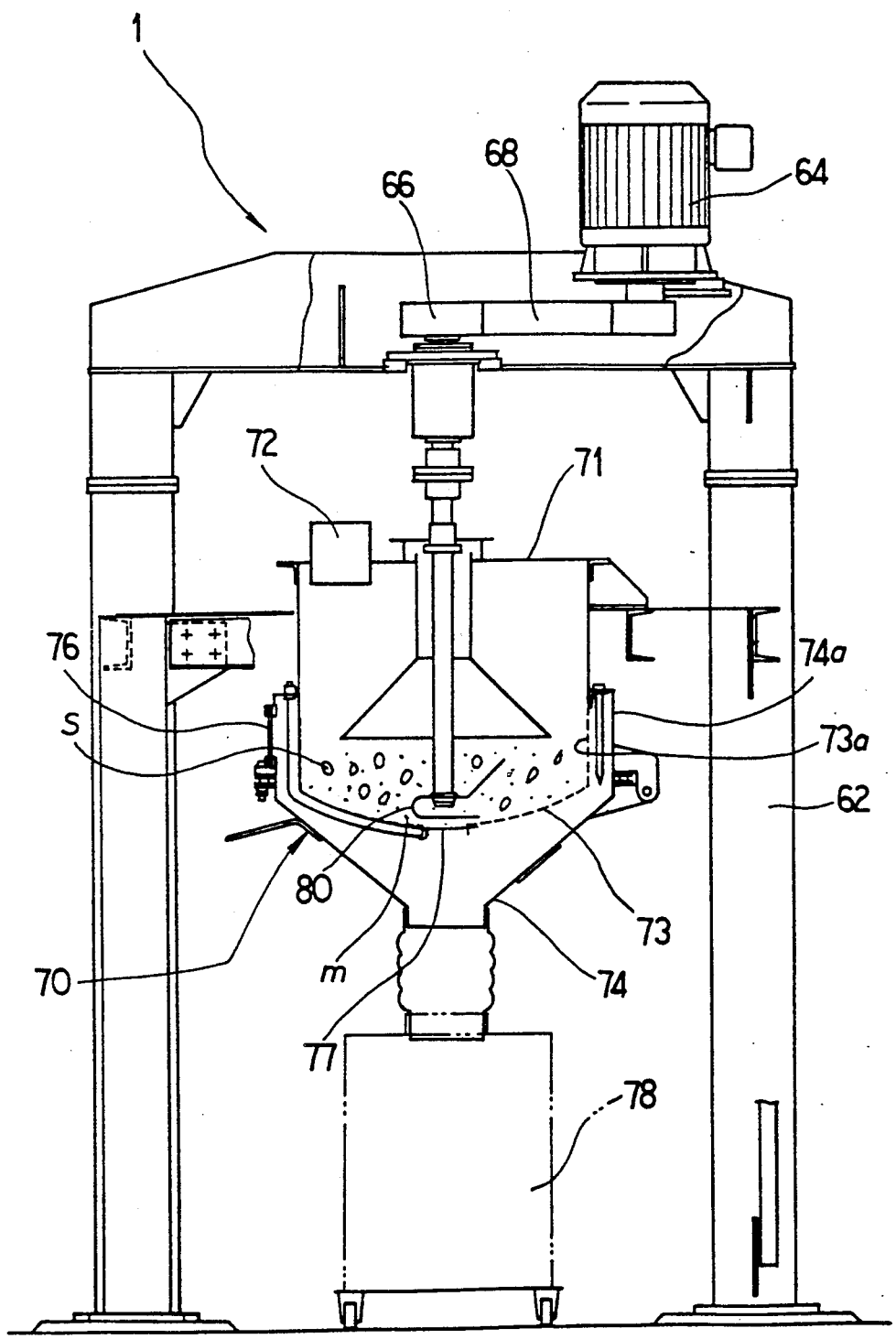
FIG. 8 is a sectional side view schematically showing a third embodiment.

The third embodiment shown in FIG. 8 comprises a container 70 supported by a frame 62, a motor 64 mounted on the frame 62, a follower shaft 66 driven by the motor 64 through the medium of a belt 68, and a seed agitating means 80 attached to the lower end of the follower shaft 66. The seed agitating means 80 is composed of striking means similar to the cutting blades in the first embodiment shown in FIG. 1.

The container 70 is composed of a container body 71 having a seed inlet opening 72, screen means 73 constituting the lower half portion of the container 70, and a collecting member 74. The screen means 73 has a cylindrical side portion 73a to allow the seed cores taken out from the seeds to pass therethrough effectively.

The collecting member 74 has a cylindrical side portion 74a surrounding the side portion 73a of the screen means 73 so as to form a space between the portions 73a and 74a. The container 70 may preferably be provided with a peep hole 76 covered with a transparent reinforced plastic plate or the like to observe the interior of the container 70.

In the drawing, reference numeral 77 denotes an openable bottom plate, and 78 a seed-core collecting receptacle.

The striking means 80 serving as the seed agitating means may be rotated at a high speed to break and remove the seed coats of the seeds S similarly to the first embodiment described above. However, it is sufficient to merely crack the seed coats of the seeds by causing the striking means 80 to be rotated at a low speed or driven for a short time.

The seed coat cracked permits penetration of water into the seed core, but still protects the seed core thereby preventing the seed core from being injured. As a result, the germinating rate of the seeds can be increased.

When stirring the seeds S in the container 70, the abrasive materials m may be added to promptly make the seed coats thin.

From the results of the experiments in which the seeds of lawn grass are stirred with the abrasion materials mainly containing silicon carbide, it was found that most suitable products can be obtained by rotating the striking means 80 at about 1300 rpm for about 90 minutes. In the experiments, the seed coats were shaved off by 5 to 10 weight %. If the seed coats are more reduced in thickness, the seed cores are susceptible to injury. If the seed coats are not shaved sufficiently, the germinating rate of the seeds is decreased. The seeds suitably shaved as noted above are easily cracked by rotating the striking means 80.

Figure 9:
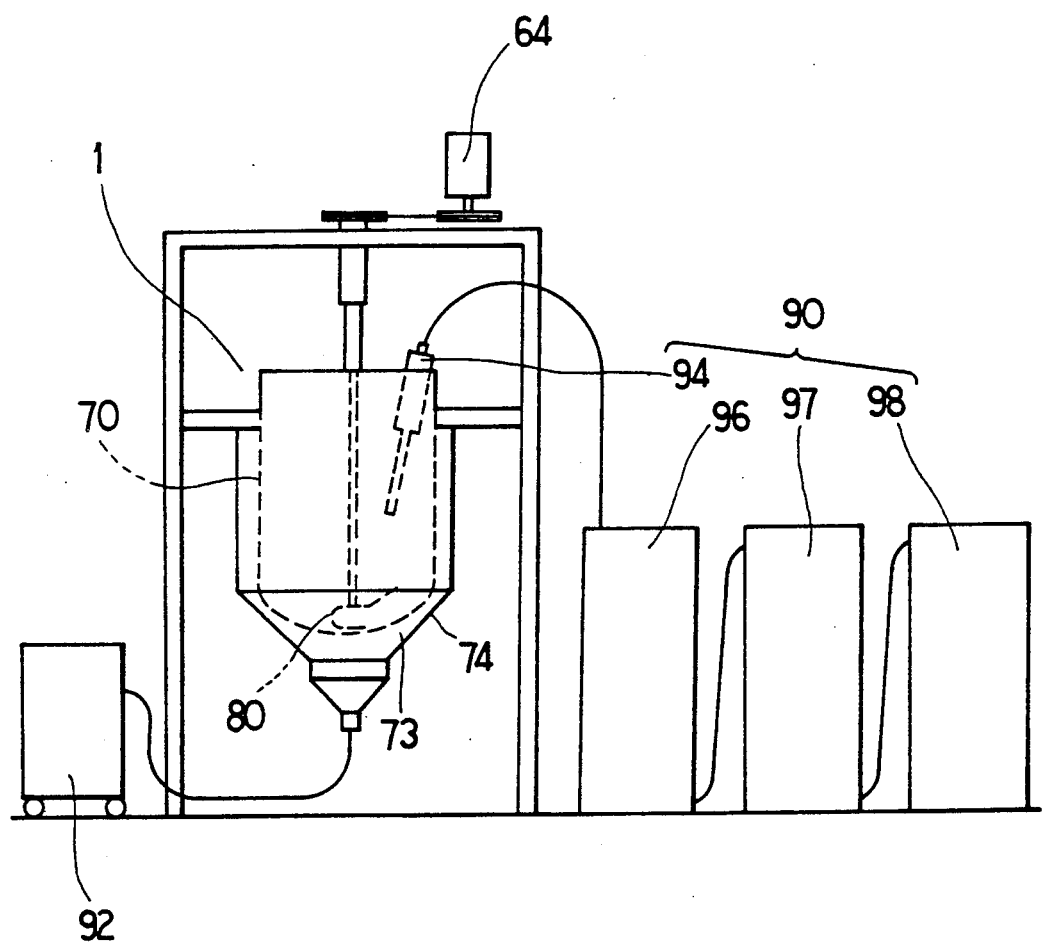
FIG. 9 is a schematic view showing a seed peeling system in a fourth embodiment of the invention.

A system including the seed peeling apparatus of this invention as described above is illustrated in FIG. 9. This seed peeling system comprises a collecting device 92 for collecting the seed cores falling on the collecting member 74 through the screen means 73 with suction force, and a seed discriminator 90 having a storage container 96 for indiscriminately sucking out through a suction means 94 and temporarily storing the seed cores, seed coats, and seeds with seed coats cracked, a separating device 97 for separating the seed cores and seeds with seed coats from the seed coats by utilization of mass differences among them, and a sieve device 98 for sieveing substances fed from the separating device 97 to completely remove the waste seed coats free from the seeds.

According to the seed peeling system described above, desired seed cores and seeds with cracked seed coats which exhibit high germinating rate can be readily mass produced automatically.

As will be apparent from the foregoing, according to the seed peeling apparatus of this invention, seeds of various sorts can be automatically peeled to remove the seed coats from the seed cores with high efficiency without inflicting too much injury to the seed cores. As a result, the germinating rate of the seeds can be increased remarkably. Besides, according to this invention, only the stripped seeds free from the seed coats can effectively be collected by utilization of difference in mass between the seed cores and seed coats. The convenient seed peeling apparatus according to this invention is simple in structure and can be manufactured at a low cost.

As can be readily appreciated, it is possible to deviate from the above embodiment of the present invention and, as will be readily understood by those skilled in this art, the invention is capable of many modifications and improvements within the scope and spirit thereof. Accordingly it will be understood that the invention is not to be limited by the specific embodiment, but only by the scope and spirit of the appended claims.

What is claimed is:

1. A seed peeling apparatus, comprising:
   a seed container having a seed inlet opening and means defining a bottom opening;
   a substantially conical keep plate disposed inside said seed container;
   seed agitating means disposed in said seed container for agitating seeds, said seed agitating means having a rotary abrasive member for stirring seeds, said rotary abrasive member having a curved and roughened surface;
   a screen means for screen seed cores, said screen means being attached to said means defining bottom opening of said container; and
   a collecting receptacle provided under said screen means;
   wherein said seed container is provided with abrasive materials therein, said abrasive materials being selected from the group consisting of silicon carbide and emery.

2. A seed peeling apparatus for seeds having a seed core coated with a seed coat, comprising:
   a seed container having a seed inlet opening and means defining a bottom opening;
   a rotatable seed agitating means in said seed container for agitating seeds in said seed container;
   a screen means for screening the seed cores from the seed coats, said screen means being attached to said means defining said bottom opening of said seed container;
   a collecting receptacle provided under said screen means
   a substantially conical keep plate disposed inside said seed container;
   a suction pipe having a suction port positioned adjacent to said keep plate; and
   a suction means connected to said suction pipes for providing a suction through said suction port for drawing seed coats separated from seed cores out of said seed container.

3. A seed peeling apparatus, comprising:
   a seed container having a seed inlet opening and means defining a bottom opening;
   a substantially conical keep plate disposed inside said seed container;
   seed agitating means disposed in said seed container for agitating seeds, said seed agitating means having a rotary cutter, said rotary cutter comprising a first upper blade and a second lower blade intersecting with said first upper blade, said second lower blade having an auxiliary blade portion extending and curving downward therefrom, wherein said first upper blade includes a flat portion, an upwardly inclined portion extending from said flat portion and a downwardly inclined portion extending from said flat portion, said upwardly and downwardly inclined portions each having a cutting edge;
   a screen means for screening seed cores, said screen means being attached to said means defining said bottom opening of said container; and
   a collecting receptacle provided under said screen means.

4. The seed peeling apparatus of claim 3 and further comprising:
   a suction pipe having a suction port positioned adjacent to said keep plate; and
   a suction means connected to said suction pipe for providing a suction through said suction port for drawing seed coats separated from seed cores out of said seed container.

5. The seed peeling apparatus of claim 3, and further comprising:
   a support means for supporting said seed container comprising a base member having said seed container thereon, a supporting column on said base member and a bracket mounted on said column for vertical movement along said supporting column, said seed agitating means being held by said bracket.

6. The seed peeling apparatus of claim 3, wherein said second lower blade has a flat portion lying flat against said flat portion of said first upper blade, an upwardly inclined portion having a cutting edge extending from one end of said flat portion of said second lower blade and said auxiliary blade portion extending from the other end of said flat portion of said second lower blade.

7. The seed peeling apparatus of claim 6, wherein said auxiliary blade portion comprises a downwardly curved portion extending from the other end of said flat portion of said second lower blade and a flat portion having a cutting edge extending from said downwardly curved portion.

8. The seed peeling apparatus of claim 3, wherein said seed agitating means further comprises a rotating shaft having a lower end with said rotary cutter connected thereto and rotary driving means for rotating said rotating shaft.

9. The seed peeling apparatus of claim 8, wherein said keep plate surrounds said rotating shaft inside said seed container above said rotary cutter.

10. The seed peeling apparatus of claim 3, and further comprising at least one lid member covering said seed inlet opening of said seed container.

11. The seed peeling apparatus of claim 3, wherein said seed container is provided with abrasive material therein.

12. The seed peeling apparatus of claim 11, wherein said abrasive materials are selected from the group consisting of silicon carbide and emery.

* * * * *